United States Patent
Oyama

(10) Patent No.: US 11,325,613 B2
(45) Date of Patent: May 10, 2022

(54) AUTOMATIC DRIVING SYSTEM

(71) Applicant: SUBARU CORPORATION, Tokyo (JP)

(72) Inventor: Hajime Oyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/988,160

(22) Filed: Aug. 7, 2020

(65) Prior Publication Data

US 2021/0086789 A1 Mar. 25, 2021

(30) Foreign Application Priority Data

Sep. 25, 2019 (JP) .............................. JP2019-174717

(51) Int. Cl.
| | |
|---|---|
| *B60W 60/00* | (2020.01) |
| *B60W 50/06* | (2006.01) |
| *B60R 1/12* | (2006.01) |
| *B60W 40/02* | (2006.01) |
| *G06K 9/00* | (2022.01) |
| *G06V 20/56* | (2022.01) |

(52) U.S. Cl.
CPC ........... *B60W 60/0015* (2020.02); *B60R 1/12* (2013.01); *B60W 40/02* (2013.01); *B60W 50/06* (2013.01); *B60W 60/0053* (2020.02); *G06V 20/56* (2022.01); *B60R 2001/1253* (2013.01); *B60W 2420/42* (2013.01)

(58) Field of Classification Search
CPC ........... G06K 9/00791; G06K 9/00798; G06K 9/00805; G06T 2207/30252; G06T 2207/30256; G06T 2207/30261; G06T 7/70; G06T 7/73; G06T 7/77; G06T 7/80; G06T 7/85; G06T 7/90; G06T 7/97
See application file for complete search history.

(56) References Cited

U.S. PATENT DOCUMENTS

| | | | |
|---|---|---|---|
| 11,093,763 B2 * | 8/2021 | Takemura | ................ B60Q 9/00 |
| 2005/0062615 A1 * | 3/2005 | Braeuchle | ............. G01S 13/867 340/903 |

(Continued)

FOREIGN PATENT DOCUMENTS

JP 2015-149614 A 8/2015

*Primary Examiner* — Russell Frejd
*Assistant Examiner* — Sara J Lewandroski
(74) *Attorney, Agent, or Firm* — McDermott Will & Emery LLP

(57) ABSTRACT

An automatic driving system allows a vehicle to travel by automatic driving. The system includes first and second detectors and first and second determiners. The first detector is disposed on a movable part of the vehicle and detects an object located around the vehicle. The second detector is disposed on the vehicle and has an object detection region that partially overlaps a detection region of the first detector. The first determiner determines whether a detection state of the first detector based on a position of the object detected by the second detector and behavior of the object estimated from a detection position of the first detector and a traveling state of the vehicle. The automatic driving availability determiner determines availability of the automatic driving according to the detection state of the first detector and disables the automatic driving when the first detector is not in a regular detection state.

12 Claims, 10 Drawing Sheets

(56) References Cited

U.S. PATENT DOCUMENTS

| | | | |
|---|---|---|---|
| 2006/0184297 A1* | 8/2006 | Higgins-Luthman | ........................ G06V 20/58 701/41 |
| 2013/0083201 A1* | 4/2013 | Takacs | ............... H04N 5/23229 348/169 |
| 2016/0048966 A1* | 2/2016 | Kuehnle | ................... G06T 5/50 348/38 |
| 2016/0347251 A1 | 12/2016 | Shigemura | |
| 2018/0174327 A1* | 6/2018 | Singh | ........................ G06T 7/80 |
| 2018/0182243 A1* | 6/2018 | Baba | ....................... G08G 1/166 |
| 2019/0202355 A1* | 7/2019 | Tatara | ....................... B60R 1/00 |
| 2020/0005489 A1* | 1/2020 | Kroeger | ................ G06V 10/44 |
| 2020/0182957 A1* | 6/2020 | Gnzel | .................... G01S 17/89 |
| 2020/0348668 A1* | 11/2020 | Poulet | .................. G08G 1/0145 |

\* cited by examiner

AUTOMATIC DRIVING SYSTEM

CROSS-REFERENCE TO RELATED APPLICATIONS

The present application claims priority from Japanese Patent Application No. 2019-174717 filed on Sep. 25, 2019, the entire contents of which are hereby incorporated by reference.

BACKGROUND

The technology relates to an automatic driving system that allows a vehicle to travel by automatic driving.

For vehicles such as automobiles, development of automatic driving systems that enable vehicles to travel without requiring a driver's driving operation is progressing. Each of such automatic driving systems generally detects objects around each vehicle using a plurality of sensors such as a camera and a radar and recognizes a traveling environment, but when a mounting position of each sensor varies due to vibration or the like, accurate recognition becomes difficult.

For this reason, for example, Japanese Unexamined Patent Application Publication No. 2015-149614 proposes a technique that stores feature values of camera images in a monitoring region and detects abnormalities in a mounting position of the vehicle-mounted cameras based on a difference from real images.

SUMMARY

An aspect of the technology provides an automatic driving system that allows a vehicle to travel by automatic driving. The automatic driving system includes a first detector, a second detector, a detection state determiner, and an automatic driving availability determiner. The first detector is configured to be disposed on a movable part of the vehicle and detect an object located around the vehicle. The second detector is configured to be disposed on the vehicle and has an object detection region that partially overlaps a detection region of the first detector. The detection state determiner is configured to determine whether a detection state of the first detector is a regular detection state on a basis of behavior of the object and a position of the object detected by the second detector. The behavior is estimated from a detection position of the first detector and a traveling state of the vehicle. The automatic driving availability determiner is configured to determine availability of the automatic driving according to the detection state of the first detector and disable the automatic driving when it is determined that the first detector is not in the regular detection state.

An aspect of the technology provides an automatic driving system that allows a vehicle to travel by automatic driving. The automatic driving system includes a first detector, a second detector, and circuitry. The first detector is configured to be disposed on a movable part of the vehicle and detect an object located around the vehicle. The second detector is configured to be disposed on the vehicle and has an object detection region that partially overlaps a detection region of the first detector. The circuitry is configured to determine whether a detection state of the first detector is a regular detection state on a basis of behavior of the object and a position of the object detected by the second detector. The behavior is estimated from a detection position of the first detector and a traveling state of the vehicle. The circuitry is configured to determine availability of the automatic driving according to the detection state of the first detector and disable the automatic driving when it is determined that the first detector is not in the regular detection state.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

When performing recognition around a vehicle, a camera or the like may be disposed on a movable part of a vehicle body, such as a door mirror, a position of which changes. Since the door mirror opens or closes between a retracted position and a deployed position, when the door mirror is closed at the retracted position for parking or the like or when the door mirror does not stop at the regular deployed position for some reason, thus preventing the detector disposed at the movable part from being in a regular detection state, the detector cannot obtain normal detection results, and problems occur in automatic driving.

It is desirable to provide an automatic driving system capable of reliably determining whether a detection state of a detector disposed on a movable part of a vehicle is in a regular detection state and properly determining possibility of automatic driving.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
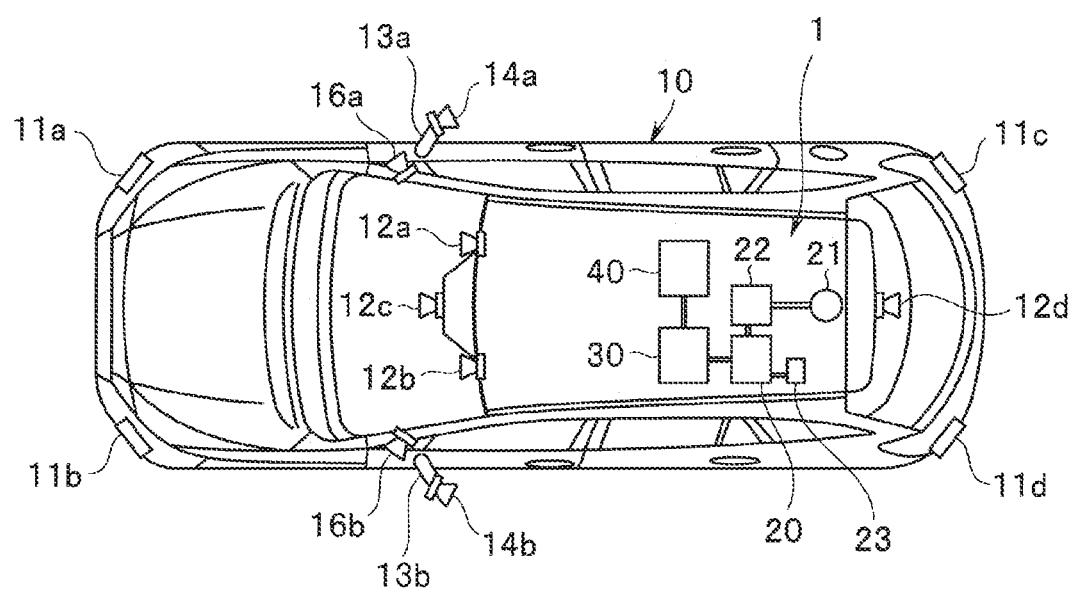
FIG. 1 is an overall configuration diagram of an automatic driving system.

FIG. 1 is an overall configuration diagram of an automatic driving system. An automatic driving system 1 illustrated in FIG. 1 is mounted on a vehicle 10 such as an automobile and controls automatic driving that allows the vehicle 10 to travel automatically without requiring a driver's driving operation. The automatic driving system 1 performs automatic driving while securing safety by detecting objects located in a detection region in a predetermined range outside the vehicle 10 using a plurality of sensors mounted on the vehicle 10 and recognizing a traveling environment.

Examples of the plurality of sensors used for detecting objects outside the vehicle 10 include radar apparatuses such as a millimeter wave radar and a laser radar, or image pickup apparatuses such as a monocular camera and a stereo camera, or a sonar. In the present embodiment, a plurality of radar apparatuses and a plurality of cameras are mounted on the vehicle 10.

As vehicle-mounted radar apparatuses, front radar apparatuses 11a and 11b for detecting forward objects are disposed in the vicinity of corners of a front bumper of the vehicle 10, and rear radar apparatuses 11c and 11d for detecting rearward objects are disposed in the vicinity of corners of a rear bumper.

As vehicle-mounted cameras, a stereo camera composed of one set of cameras 12a and 12b for picking up images of a front visual field and a monocular front camera 12c are disposed in at the top inside a windshield, and a rear camera 12d for picking up images of a rear visual field is disposed at the rear of the vehicle 10.

Furthermore, a side camera 14a for picking up images of a detection region on the right side of the vehicle 10 is disposed on a right-side door mirror 13a outside the vehicle room of the vehicle 10 and a side camera 14b for picking up images of a detection region on left side of the vehicle 10 is disposed on a left-side door mirror 13b outside the vehicle room of the vehicle 10.

Figure 3:
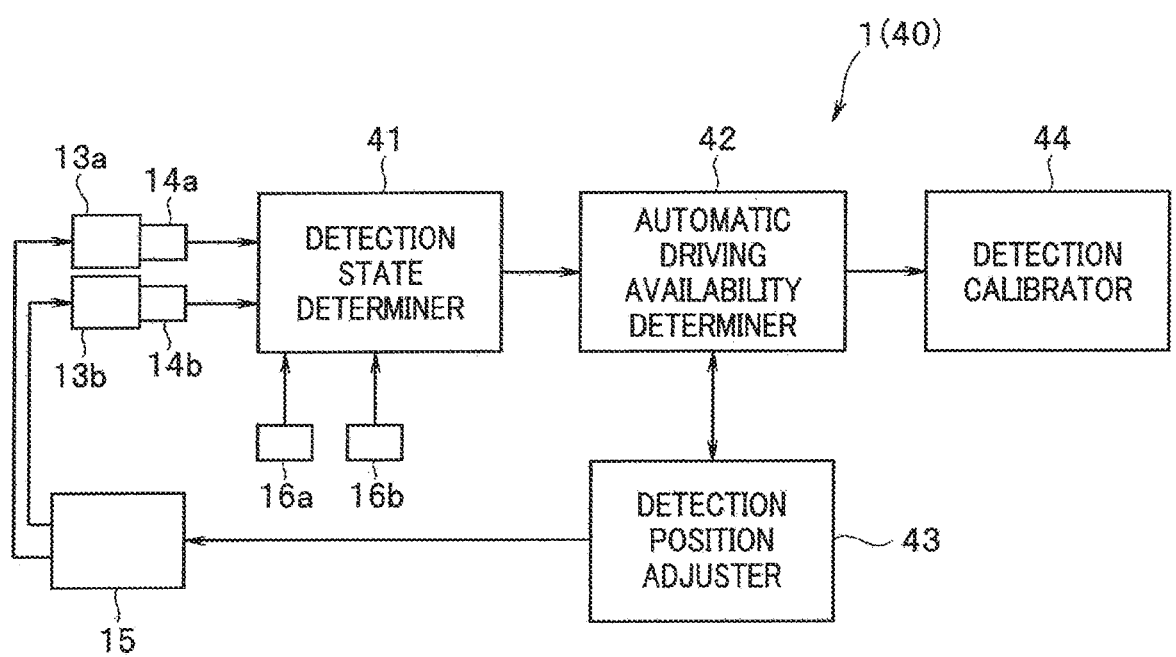
FIG. 3 is a block diagram illustrating a functional configuration of an automatic driving control unit.

The door mirrors 13a and 13b are movable parts, positions of which can be variably operated at sides of the vehicle through built-in motors (not illustrated), with a closing operation to a retracted position and an opening operation to a deployed position being controlled by a controller 15 (see FIG. 3). The side cameras 14a and 14b pick up images of the regions at the sides of the vehicle 10 and can detect objects assuming that the door mirrors 13a and 13b are in deployed positions.

Assuming the side cameras 14a and 14b to be first detectors, the vehicle 10 is also provided with cameras 16a and 16b as second detectors including detection regions partially overlapping the detection regions of the first detectors. The cameras 16a and 16b are adjacent cameras adjacent to the side cameras 14a and 14b and are disposed in the vehicle room near front pillars located, for example, ahead of the door mirrors 13a and 13b.

Figure 2:
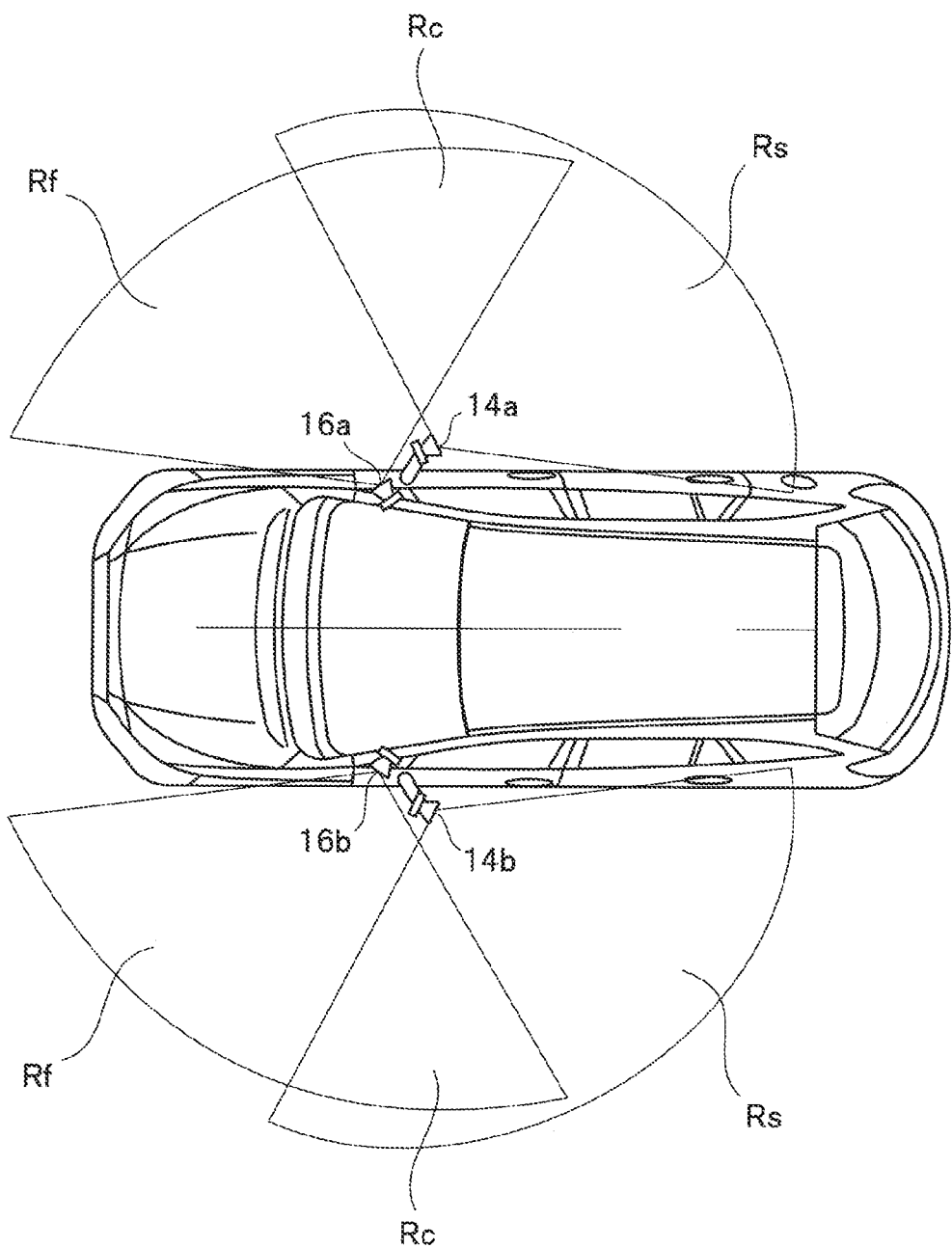
FIG. 2 is an explanatory diagram illustrating detection regions at sides of a vehicle.

FIG. 2 is an explanatory diagram illustrating detection regions at sides of the vehicle. As illustrated in FIG. 2, the adjacent cameras 16a and 16b have imaging visual fields overlapping imaging visual fields of detection regions (imaging visual fields) Rs of the side cameras 14a and 14b in partial regions Rc and configured to pick up images of regions Rf ahead of the regions of the side cameras 14a and 14b.

Next, a control system of the vehicle 10 will be described. The vehicle 10 is mounted with a locator unit 20 that positions an own position, an electronic control unit for vehicle control (vehicle control ECU) 30, an automatic driving control unit (automatic driving ECU) 40 that controls automatic driving. Each unit 20, 30 or 40 is mainly constructed of a computer including a single processor or a plurality of processors and coupled to a network via a communication bus (not illustrated).

The locator unit 20 detects position coordinates of the vehicle through positioning by satellite navigation based on signals from a plurality of satellites and positioning by autonomous navigation using a vehicle-mounted sensor together, compares the position coordinates with high resolution map information held by the locator unit 20, and thereby identifies the own position. For this reason, an antenna 21 for receiving signals from a plurality of navigation satellites such as GNSS (Global Navigation Satellite System) satellites, a gyro sensor 22, and a communication terminal 23 for mobile communication such as road-to-vehicle communication and vehicle-to-vehicle communication are coupled to the locator unit 20.

The vehicle control ECU 30 executes drive control of an electric motor or an engine, brake control, steering control or the like of the vehicle 10. For example, as the drive control of the engine, the vehicle control ECU 30 controls a driving state of the engine based on signals from various sensors for detecting an engine operating state and various control information acquired via a network.

The vehicle control ECU 30 controls brake apparatuses of four wheels independently of the driver's brake operation based on a brake switch, wheel speeds of the four wheels, a steering angle, a yaw rate and other vehicle information as the brake control, and further executes anti-lock brake control and side slip prevention control or the like. Furthermore, the vehicle control ECU 30 controls steering torque using an electric power steering (EPS) apparatus based on the vehicle speed, the driver's steering torque, steering angle, yaw rate and other vehicle information as the steering control.

In contrast to a manual driving mode in which the driver causes the own vehicle to travel by performing all driving operations such as steering, acceleration/deceleration, braking, the automatic driving ECU 40 controls a driving assist mode to assist the driver's driving operation or controls automatic driving without requiring the driver's driving operation. Such automatic driving control is executed using artificial intelligence centered on, for example, Deep Neural Network (DNN).

For example, the automatic driving ECU 40 inputs data and various control information from a plurality of sensors to an input layer of the Deep Neural Network and acquires control parameters of automatic driving from an output layer. The automatic driving ECU 40 sends the control parameters outputted from the Deep Neural Network to the vehicle control ECU 30 to enable optimum automatic driving.

When the control parameters of automatic driving are calculated, inputs from the plurality of sensors for detecting objects outside the vehicle 10 are integrated, an identical object detected by the respective sensors is recognized and registered as a unique object on a single world map. In this case, since the side cameras 14a and 14b are fixed to the door mirrors 13a and 13b, which are movable parts of the vehicle 10, when the door mirrors 13a and 13b are not in regular deployed positions or when distortions of the side cameras 14a and 14b have increased, the unique object may not be correctly recognized, causing wrong recognition.

Thus, the automatic driving ECU 40 checks inputs from the side cameras 14a and 14b and determining possibility of automatic driving. FIG. 3 is a block diagram illustrating a functional configuration of the automatic driving control unit, and the automatic driving ECU 40 is provided with a detection state determiner 41, an automatic driving availability determiner 42, a detection position adjuster 43 and a detection calibrator 44.

The detection state determiner 41 determines whether the side cameras 14a and 14b are in regular detection states in which automatic driving is enabled based on conditions (1) to (3) described below.

(1) Detection Positions of Side Cameras 14a and 14b

As one of conditions that the side cameras 14a and 14b are determined to be in regular detection states, the detection state determiner 41 determines whether the condition that the detection positions of the side cameras 14a and 14b are in regular positions is satisfied. Whether the detection positions of the side cameras 14a and 14b are in regular positions is determined based on opening/closing positions of the door mirrors 13a and 13b and detection regions of the side cameras 14a and 14b.

For example, the detection state determiner 41 determines that the side cameras 14a and 14b are in regular positions when the door mirrors 13a and 13b are in deployed positions and when characteristic features of the vehicle body at the sides of the vehicle 10 reflected in the images of the side cameras 14a and 14b are located within a predetermined threshold range.

The opening/closing positions of the door mirrors 13a and 13b are determined by reading signals of the controller 15 that controls opening/closing of the door mirrors 13a and 13b or reading signals of switches for manually opening/closing the door mirrors 13a and 13b. As for the characteristic features of the vehicle 10 reflected in the images of the side cameras 14a and 14b, part of a shape or color of the vehicle body side is set in advance as a characteristic feature.

Note that as to whether the side cameras 14a and 14b are in regular positions, the determination on the opening/closing positions of the door mirrors 13a and 13b may be omitted and a determination may be made only based on images of the side cameras 14a and 14b.

Figure 4:
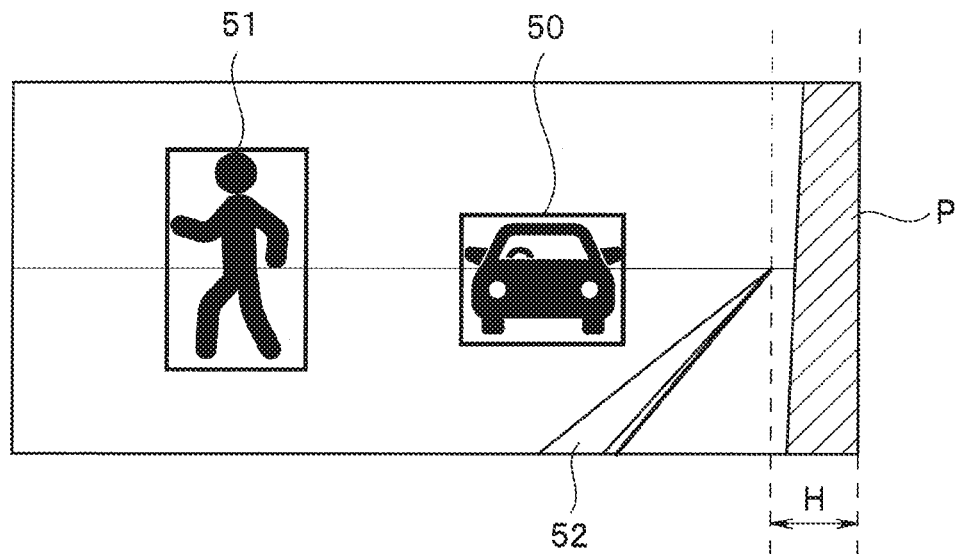
FIG. 4 is an explanatory diagram illustrating an example of an image of a side camera at a regular position.

FIG. 4 is an explanatory diagram illustrating an example of an image of a side camera at a regular position. Although an image of the side camera 14a fixed to the right-side door mirror 13a will be described as an example, the same applies to the side camera 14b fixed to the left-side door mirror 13b.

A following vehicle 50, a pedestrian 51 and a road lane line 52 are reflected in the image illustrated in FIG. 4, and a region with a threshold H is set in the vicinity of the road lane line 52 on the side of the image. When the door mirror 13a is in a deployed position, if the side camera 14a is normal, a vehicle body part P set as the characteristic feature at the side of the vehicle body is reflected within a range of the region with the threshold H.

On the other hand, when the door mirror 13a is in a retracted position or stopped at a position separated from the regular deployed position due to the occurrence of a malfunction or further, a distortion occurs in the image of the side camera 14a, the vehicle body part P is outside the range of the region with the threshold H. In such a case, the side camera 14a is determined to be in an irregular position.

Figure 5:
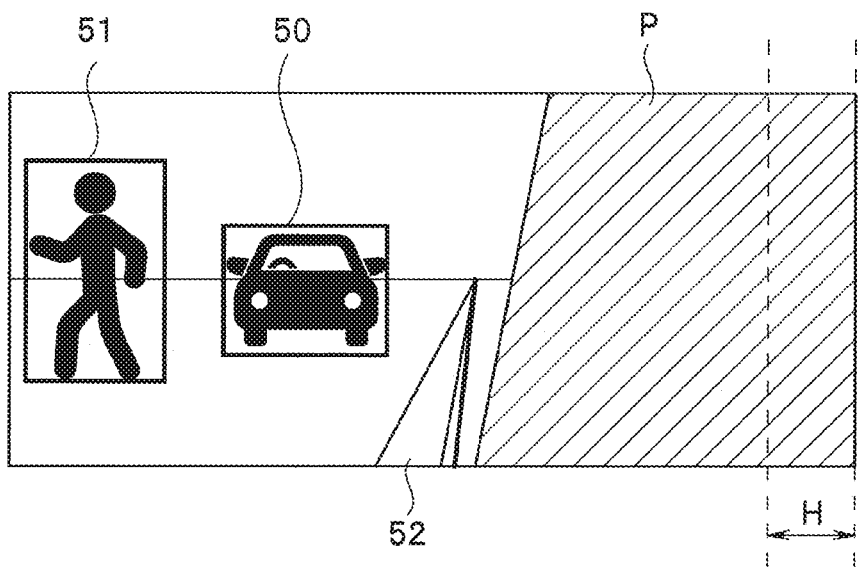
FIG. 5 is an explanatory diagram illustrating an example 1 of an image of the side camera at an irregular position.
Figure 6:
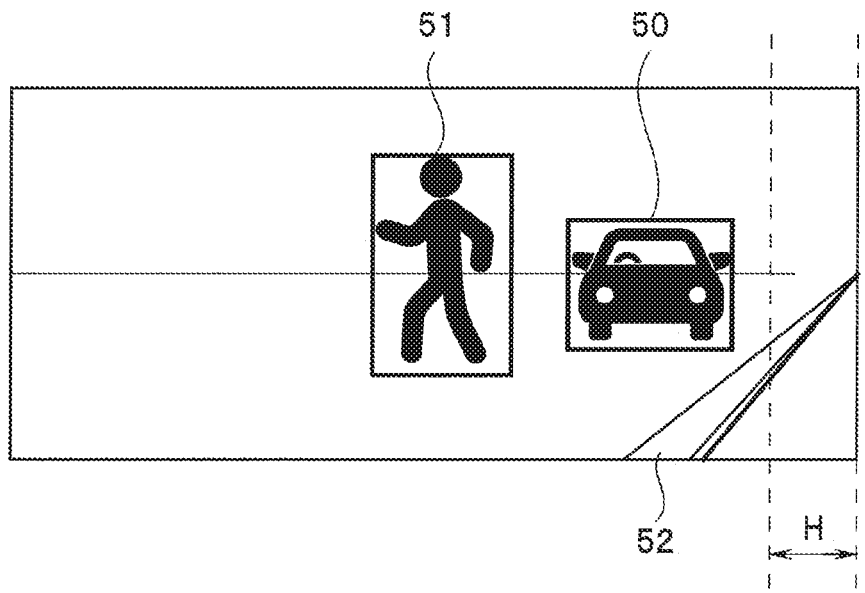
FIG. 6 is an explanatory diagram illustrating an example 2 of an image of the side camera at an irregular position.

FIG. 5 is an explanatory diagram illustrating an example 1 of an image of the side camera at an irregular position. In FIG. 5, the vehicle body part P in the image sticks out beyond the region with the threshold H to near the center of the image, and the side camera 14a is determined not to be in the regular position but to be in the irregular position. FIG. 6 is an explanatory diagram illustrating an example 2 of an image of the side camera at an irregular position. In FIG. 6, the vehicle body part P is not detected in the image, and the side camera 14a is not in the regular position and determined to be in the irregular position.

Figure 7:
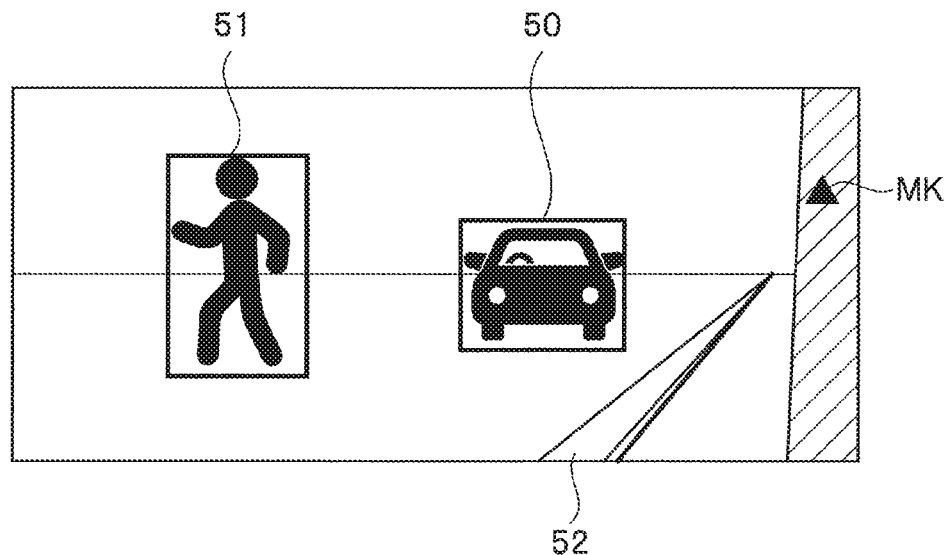
FIG. 7 is an explanatory diagram illustrating a marker in an image at a regular position.

Here, as illustrated in FIG. 7, a more explicit marker may be set in the vehicle body instead of the shape or color of the vehicle body side as the characteristic feature of the vehicle. FIG. 7 is an explanatory diagram illustrating a marker in an image at the regular position and a marker MK is reflected in the region with the threshold H.

Figure 8:
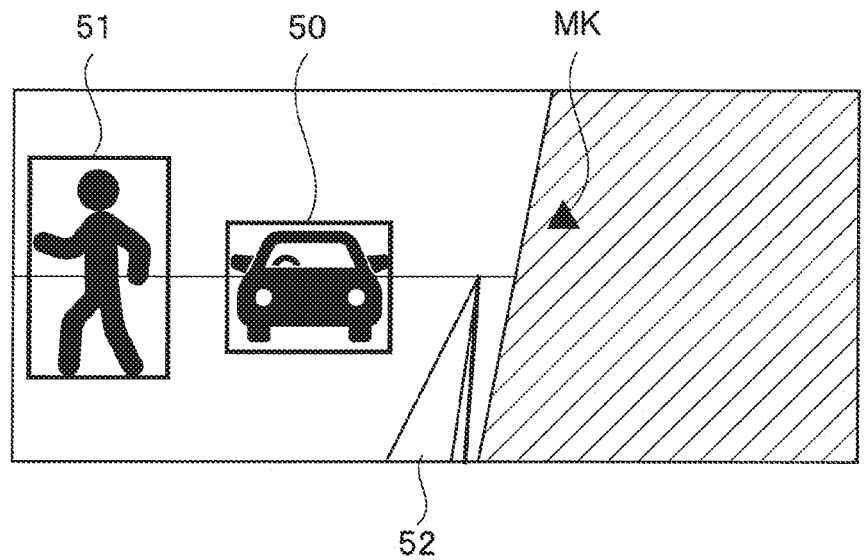
FIG. 8 is an explanatory diagram illustrating a marker in an image at an irregular position.
Figure 9:
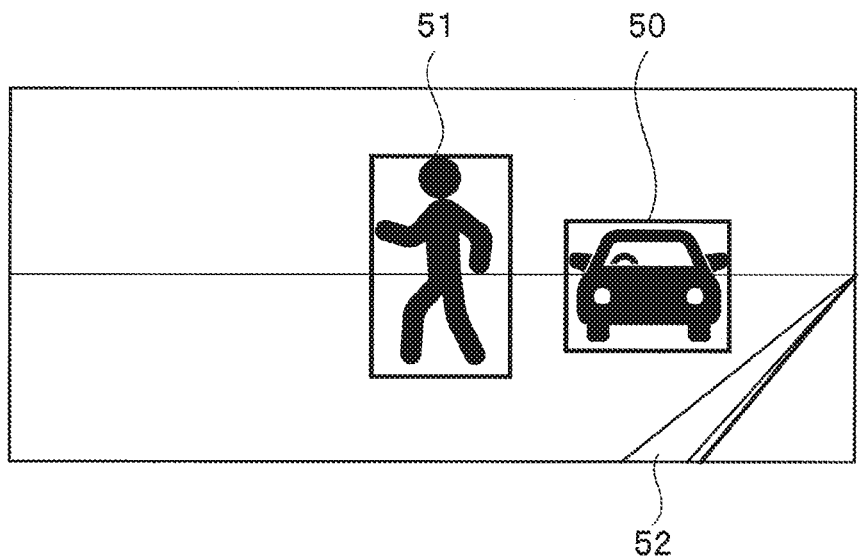
FIG. 9 is an explanatory diagram illustrating an image in which no marker is detected at an irregular position.

On the other hand, FIG. 8 is an explanatory diagram illustrating a marker in an image at the irregular position and the marker MK is reflected in the vicinity of the image center separated from the regular position in FIG. 7 and the side camera 14a is determined not to be in the regular position but to be in the irregular position. FIG. 9 is an explanatory diagram illustrating an image in which no marker is detected at the irregular position and the marker MK is not detected in the image and the side camera 14a is determined not to be in the regular position but to be in the irregular position.

(2) Behavior of Object Estimated from Traveling State of Vehicle

As the condition that the side cameras 14a and 14b are in regular detection states, the detection state determiner 41 determines whether the condition that the behavior of an object detected from images of the side cameras 14a and 14b coincides with the behavior of the corresponding object estimated from the traveling state of the vehicle is satisfied in addition to the condition (1).

For example, the detection state determiner 41 selects an object moving slower than the own vehicle close to a stationary state from images of the side cameras 14a and 14b and estimates a movement vector of the selected low-speed object based on a yaw rate of the own vehicle. The detection state determiner 41 compares the movement vector of the low-speed object with the movement vector of the own vehicle and determines, when the movement vector of the low-speed object is in a direction opposite to the movement vector of the own vehicle over a set range (for example, range of azimuth angle 180 degrees±set angle), that the side cameras 14a and 14b are in the regular detection states.

Figure 10:
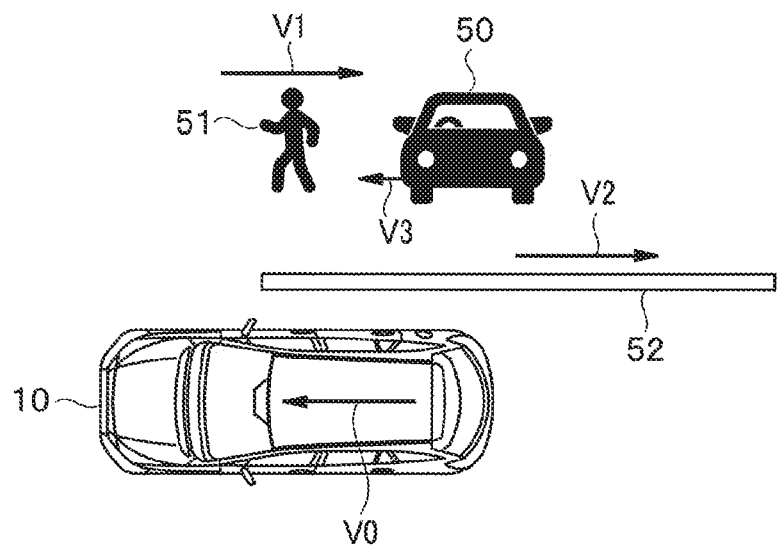
FIG. 10 is an explanatory diagram illustrating an object movement vector with the detection result in FIG. 4 relocated.

FIG. 10 is an explanatory diagram illustrating an object movement vector with the detection result in FIG. 4 relocated and a movement vector V1 of the pedestrian 51 close to a stationary state and a movement vector V2 of a road lane line 52 are in a direction opposite to the movement vector V0 of the own vehicle 10. A movement vector V3 of the following vehicle 50 during traveling is in a direction substantially equal to the movement vector V0 of the own vehicle. The side camera 14a in the example in FIG. 10 is determined to be in the regular detection state if any one of the conditions (1) and (3) is not satisfied.

Figure 11:
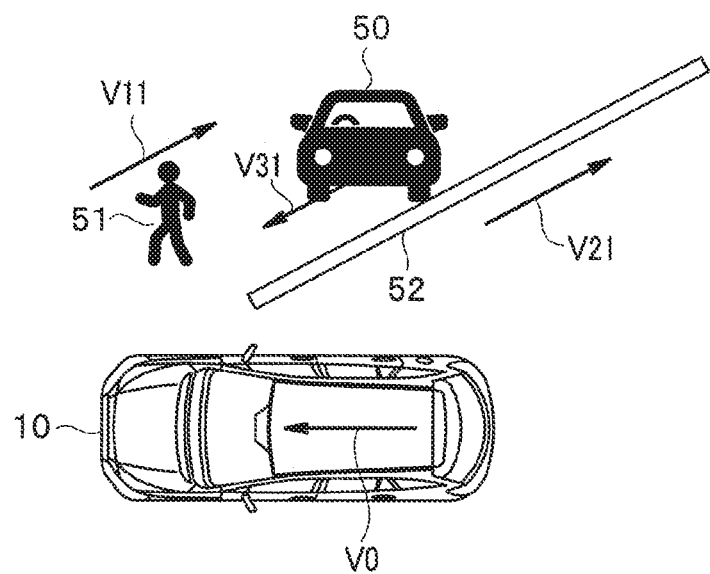
FIG. 11 is an explanatory diagram illustrating an object movement vector with the detection result in FIG. 5 relocated.

On the other hand, FIG. 11 is an explanatory diagram illustrating an object movement vector with the detection result in FIG. 5 relocated, and the movement vector V11 of the pedestrian 51 close to a stationary state and the movement vector V21 of the road lane line 52 are not in a direction opposite to the movement vector V0 of the own vehicle 10. A movement vector V31 of the following vehicle 50 is not parallel to the movement vector V0 of the own vehicle, but is diagonally oriented to the movement vector V0. The side camera 14a is determined not to be in the regular detection state in the example in FIG. 11.

(3) Position of Object Detected by Adjacent Cameras 16a and 16b

As the conditions that the side cameras 14a and 14b are in regular detection states, the detection state determiner 41 determines whether the position of the object detected from the images of the side cameras 14a and 14b coincides with the position of an identical object detected from the images of the adjacent cameras 16a and 16b in addition to the conditions (1) and (2).

Figure 12:
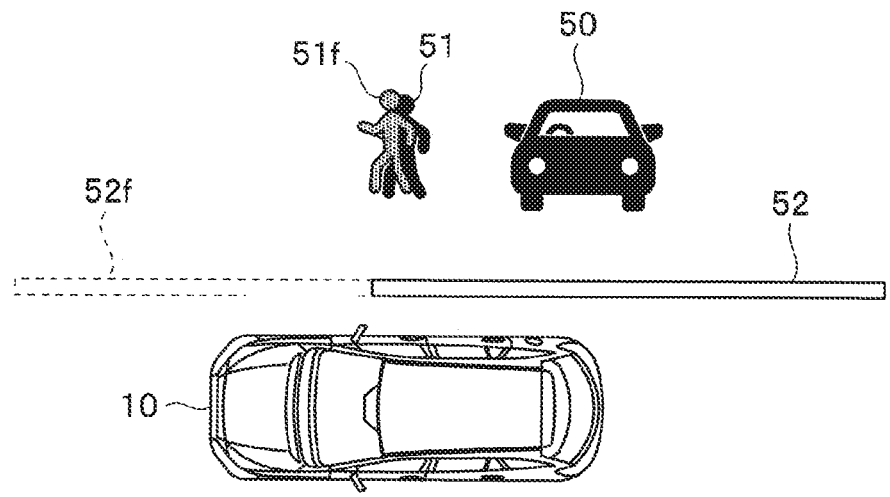
FIG. 12 is an explanatory diagram illustrating an object detection position with the detection result in FIG. 4 relocated.

FIG. 12 is an explanatory diagram illustrating an object detection position with the detection result in FIG. 4 relocated and the position of the pedestrian 51 detected by the side camera 14a is assumed to coincide with the position of the same pedestrian 51f detected by the adjacent camera 16a within a set range. Likewise, the road lane line 52 detected by the side camera 14a is also detected in the same direction partially overlapping the same road lane line 52a detected by the adjacent camera 16a. In the example in FIG. 12, the side camera 14a is determined to be in the regular detection state if any one of the conditions (1) and (2) is not satisfied.

Figure 13:
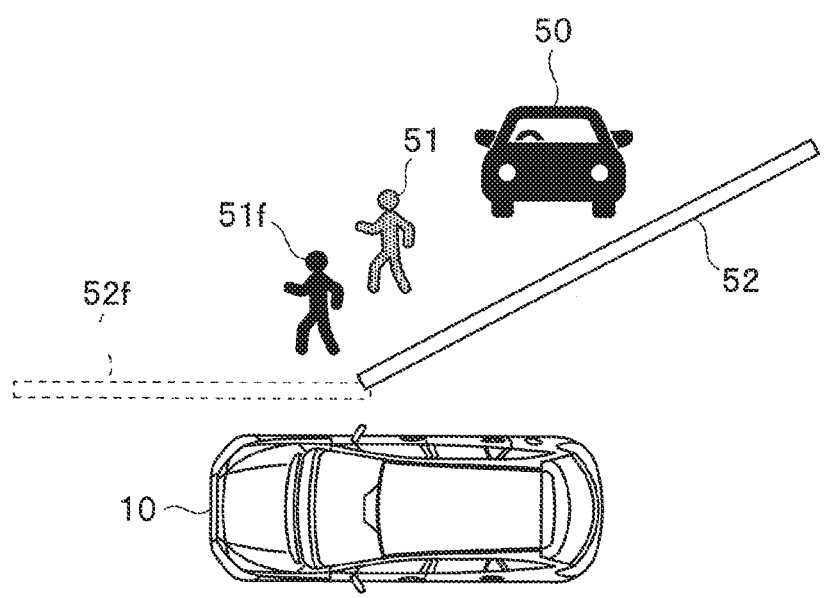
FIG. 13 is an explanatory diagram illustrating an object detection position with the detection result in FIG. 5 relocated.

On the other hand, FIG. 13 is an explanatory diagram illustrating an object detection position with the detection result in FIG. 5 relocated and the position of the pedestrian 51 detected by the side camera 14a and the position of the same pedestrian 51f detected by the adjacent camera 16a are outside the set range and do not coincide with each other. Likewise, the road lane line 52 detected by the side camera 14a does not coincide with the same road lane line 52f detected by the adjacent camera 16a and are detected in different directions. The example in FIG. 13 is an example where the side camera 14a is not in the regular detection state, but when the positions do not coincide a plurality of times (for example, three times) consecutively, the detection state determiner 41 determines that the side camera 14a is not in the regular detection state.

When all the above conditions (1), (2) and (3) are satisfied, the detection state determiner 41 determines that the side cameras 14a and 14b are determined to be in the regular detection states, whereas when any one condition is not satisfied, the side cameras 14a and 14b are determined not to be in the regular detection states. The determination result as to whether the side cameras 14a and 14b are in the regular detection states is sent to the automatic driving availability determiner 42.

The automatic driving availability determiner 42 determines availability of automatic driving based on the detection states of the side cameras 14a and 14b. When the side cameras 14a and 14b are determined to be in the regular detection states, the automatic driving availability determiner 42 determines that automatic driving is enabled or when the side cameras 14a and 14b are determined not to be in the regular detection states, the automatic driving availability determiner 42 determines that automatic driving is disabled.

At this time, if automatic driving is in progress, the automatic driving availability determiner 42 facilitates the driver to switch to manual driving, causing the vehicle to perform evacuation traveling to stop at a safe place such as a road shoulder depending on the situation. When automatic driving is not started yet, the automatic driving availability determiner 42 prohibits start of automatic driving.

Note that in the present embodiment, when at least one of the side cameras 14a or 14b is not in the regular detection state, the automatic driving availability determiner 42 determines that automatic driving is disabled. However, depending on the traveling environment, if the detection state of one of the side cameras 14a and 14b is in the regular detection state, automatic driving may be allowed under limited conditions.

When the detection state determiner 41 determines that the side cameras 14a and 14b are not in the regular detection states, the detection position adjuster 43 causes the door mirrors 13a and 13b to repeatedly perform opening/closing operation via the controller 15 at the deployed position and the retracted position a predetermined number of times and then stops the door mirrors 13a and 13b in the deployed positions. The detection state determiner 41 determines again whether the side cameras 14a and 14b are in the regular detection states.

After the detection position adjuster 43 causes the door mirrors 13a and 13b to perform opening/closing operation, if the side cameras 14a and 14b are not in the regular detection states yet, the detection state determiner 41 determines that an abnormality has occurred and notifies the automatic driving availability determiner 42 of the abnormality. Upon receiving notification of the abnormality from the detection position adjuster 43, the automatic driving availability determiner 42 determines that automatic driving is disabled.

Figure 14:
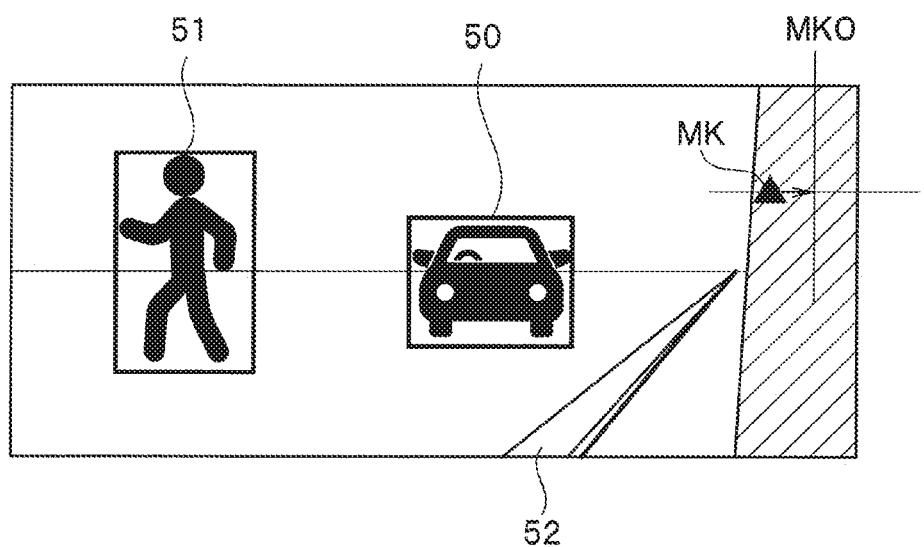
FIG. 14 is an explanatory diagram illustrating image calibration based on a marker position.

When the detection state determiner 41 determines that the side cameras 14a and 14b are in the regular detection states, the detection calibrator 44 examines whether image calibration is necessary based on position information on the characteristic feature in the image, and adjusts the image if the image calibration is necessary. As illustrated in FIG. 14, an example will be described where the aforementioned marker MK is used as the characteristic feature of the image. FIG. 14 is an explanatory diagram illustrating image calibration based on the marker position.

In the image illustrated in FIG. 14, the position of the marker MK in the image is deviated from an original position MKO and a center of a detection region with respect to an object outside the vehicle is slightly deviated from the original central position. Therefore, the detection calibrator 44 performs a geometric conversion that moves the entire image so that the position of the marker MK is reset to the original position MKO, finely adjusts the image and calibrates it so as to restore the original detection region.

Figure 15:
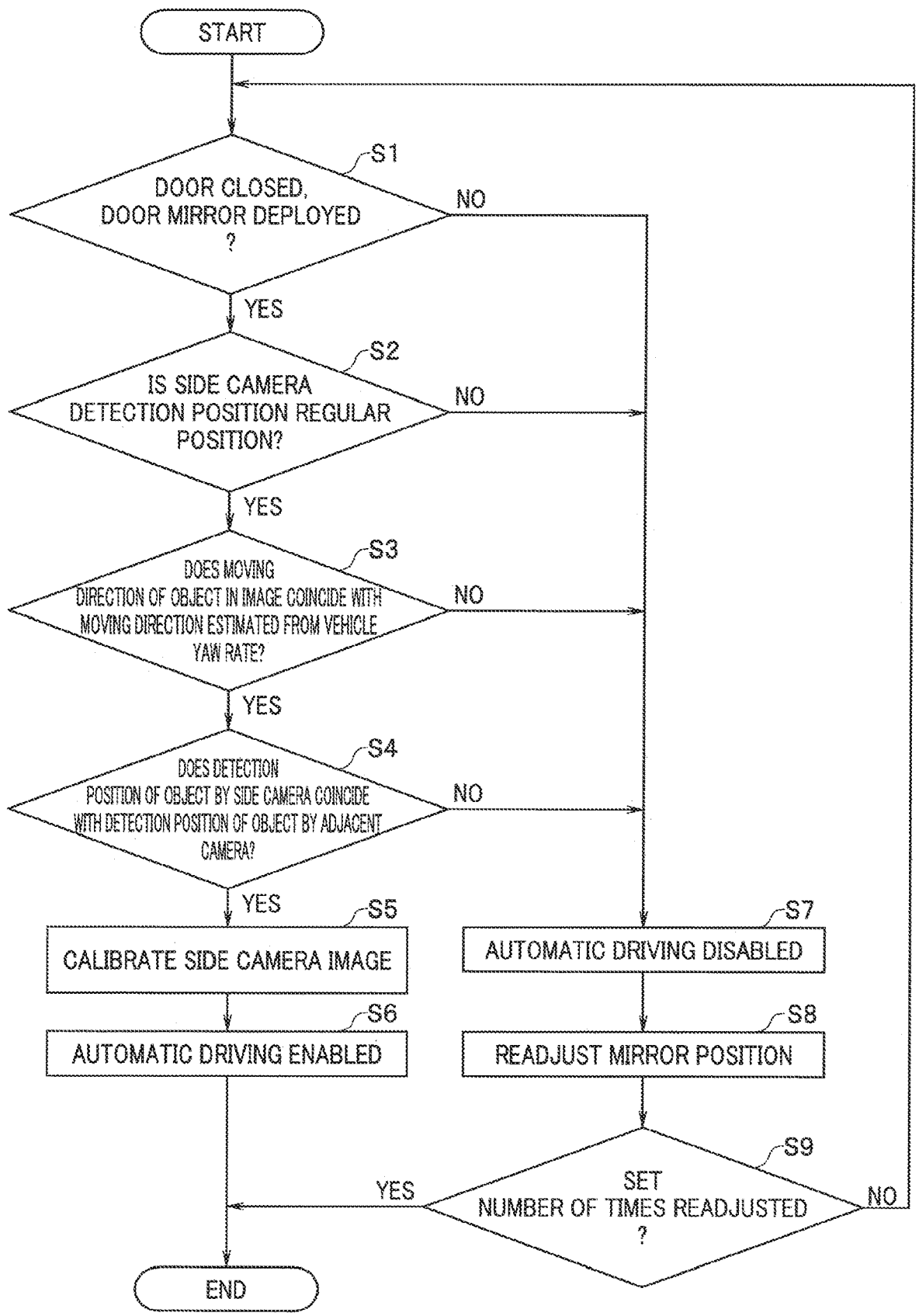
FIG. 15 is a flowchart of automatic driving possibility determination processing.

Next, an automatic driving availability determination according to detection states of the side cameras 14a and 14b will be described focusing on operation of the automatic driving ECU 40 illustrated in a flowchart in FIG. 15. FIG. 15 is a flowchart of automatic driving availability determination processing.

In first step S1, the automatic driving ECU 40 examines whether the door mirrors 13a and 13b are in the deployed positions when the doors of the vehicle are closed. Whether the door mirrors 13a and 13b are in the deployed positions is checked by reading signals of the controller 15 controlling opening/closing of the door mirrors 13a and 13b or reading signals of the switch that opens/closes the door mirrors 13a and 13b.

When any of the doors of the vehicle are opened or the door mirrors 13a and 13b are not in the deployed positions, the automatic driving ECU 40 determines in step S7 that automatic driving is disabled and proceeds to a process in step S8. In the process in step S8, the automatic driving ECU 40 instructs the controller 15 to cause the door mirrors 13*a* and 13*b* to perform opening/closing operation between the deployed position and the retracted position with the doors closed and readjusts the mirror positions.

After that, in step S9, the automatic driving ECU 40 examines whether the mirror positions have been readjusted a set number of times. When the mirror positions have not been readjusted the set number of times, the automatic driving ECU 40 returns to step S1 to check again whether the doors of the vehicle are closed and the door mirrors 13*a* and 13*b* are in the deployed positions.

As a result, when it has been checked that the doors of the vehicle are closed and the door mirrors 13*a* and 13*b* are in the deployed positions, the flow proceeds from step S1 to step S2. On the other hand, when the door mirrors 13*a* and 13*b* are not set in the deployed positions even when the mirror positions have been readjusted a set number of times, the automatic driving ECU 40 determines that an abnormality has occurred, disables automatic driving and ends the present processing.

In step S2, the automatic driving ECU 40 examines whether the detection positions of the side cameras 14*a* and 14*b* are the regular positions based on the vehicle body part P or marker MK, which is the characteristic feature of the own vehicle body reflected in the images of the side cameras 14*a* and 14*b*. When the detection positions of the side cameras 14*a* and 14*b* are not the regular positions, it is determined in step S7 that automatic driving is disabled or the flow proceeds to step S3 when the detection positions of the side cameras 14*a* and 14*b* are the regular positions.

In step S3, the automatic driving ECU 40 examines whether the movement direction of the object detected from the images of the side cameras 14*a* and 14*b* matches the movement direction of the corresponding object estimated from the yaw rate of the vehicle. When the movement direction of the detected object on the images does not match the movement direction estimated from the yaw rate, the automatic driving ECU 40 determines in step S7 that automatic driving is disabled or proceeds to step S4 when the movement directions match.

In step S4, the automatic driving ECU 40 examines whether the detection positions of the object in the images of the side cameras 14*a* and 14*b* match the detection positions of the corresponding object by the adjacent cameras 16*a* and 16*b* adjacent to the side cameras 14*a* and 14*b*. When the detection positions of the object in the images of the side cameras 14*a* and 14*b* do not match the detection positions of the corresponding object by the adjacent cameras 16*a* and 16*b* a plural number of times consecutively, the automatic driving ECU 40 determines in step S7 that automatic driving is disabled.

On the other hand, when the detection positions of the object in the images of the side cameras 14*a* and 14*b* match the detection positions of the corresponding object by the adjacent cameras 16*a* and 16*b*, the automatic driving ECU 40 calibrates the images of the side cameras 14*a* and 14*b* in step S5. Note that calibration of the camera images is performed when the position of the characteristic feature of the vehicle in the images is deviated from the original position, and calibration is not performed when the position of the characteristic feature is within an allowable range with respect to the original position.

In step S6, the automatic driving ECU 40 determines that the side cameras 14*a* and 14*b* are in the regular detection states and that automatic driving is enabled, and ends the present processing. This makes it possible to correctly recognize an identical object outside the vehicle detected by a plurality of cameras as a unique object, properly recognize a traveling environment and perform automatic driving while securing safety.

Thus, in the present embodiment, the automatic driving ECU 40 as the center of the automatic driving system 1 determines whether the detection states of the side cameras 14*a* and 14*b* disposed on the door mirrors 13*a* and 13*b* are regular detection states based on the detection positions of the side cameras 14*a* and 14*b*, the behavior of the object estimated from the traveling state of the vehicle and the position of the object detected by the adjacent cameras 16*a* and 16*b*, detection regions of which partially overlap with the detection regions of the side cameras 14*a* and 14*b*. When the side cameras 14*a* and 14*b* are not in the regular states, automatic driving is disabled, and so it is possible to reliably determine whether the detection states of the detectors disposed on the movable parts of the vehicle are in the regular detection states and properly determine availability of automatic driving.

In addition to the aforementioned microcomputer, the locator unit 20, the vehicle control electronic control unit 30, and the automatic driving control unit 40 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the automatic driving control unit 40 including the detection state determiner 41, the automatic driving availability determiner 42, the detection position adjuster 43 and the detection calibrator 44. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 3.

Although an embodiment of the technology has been described in the foregoing by way of example with reference to the accompanying drawings, the technology is by no means limited to the embodiment described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An automatic driving system that allows a vehicle to travel by automatic driving, the automatic driving system comprising:
   a first detector configured to be disposed on a movable part of the vehicle and to detect an object located around the vehicle;
   a second detector configured to be disposed on the vehicle, the second detector having an object detection region that partially overlaps a detection region of the first detector;

at least one processor configured to function as: a detection state determiner configured to determine whether a detection state of the first detector is a regular detection state on a basis of behavior of the object and a position of the object detected by the second detector, the behavior being estimated from a detection position of the first detector and a traveling state of the vehicle; and an automatic driving availability determiner configured to determine availability of the automatic driving according to the detection state of the first detector and disable the automatic driving when it is determined that the first detector is not in the regular detection state, wherein the automatic driving system further comprises a detection calibrator configured to calibrate, when the first detector is in the regular detection state, a detection result of the first detector based on position information of a characteristic feature of the vehicle, and wherein when no characteristic feature of the vehicle is included in a set range of the detection region of the first detector, the detection state determiner determines that the first detector is not in the regular detection state.

2. The automatic driving system according to claim 1, further comprising a detection position adjuster configured to adjust the detection position of the first detector when the first detector is not in the regular detection state.

3. The automatic driving system according to claim 2, wherein the characteristic feature of the vehicle is a shape or color of part of the vehicle.

4. The automatic driving system according to claim 2, wherein the characteristic feature of the vehicle is a marker provided on the vehicle.

5. The automatic driving system according to claim 2, wherein the movable part is a door mirror to be selectively moved to a retracted position or a deployed position, and the first detector is a camera to be fixed to the door mirror.

6. The automatic driving system according to claim 1, wherein the characteristic feature of the vehicle is a marker provided on the vehicle.

7. The automatic driving system according to claim 1, wherein the movable part is a door mirror to be selectively moved to a retracted position or a deployed position, and the first detector is a camera to be fixed to the door mirror.

8. The automatic driving system according to claim 1, wherein the characteristic feature of the vehicle is a shape or color of part of the vehicle.

9. An automatic driving system that allows a vehicle to travel by automatic driving, the automatic driving system comprising:
a first detector configured to be disposed on a movable part of the vehicle and to detect an object located around the vehicle;
a second detector configured to be disposed on the vehicle, the second detector having an object detection region that partially overlaps a detection region of the first detector; and
at least one processor configured to functions as:
a detection state determiner configured to determine whether a detection state of the first detector is a regular detection state on a basis of behavior of the object and a position of the object detected by the second detector, the behavior being estimated from a detection position of the first detector and a traveling state of the vehicle; and
an automatic driving availability determiner configured to determine availability of the automatic driving according to the detection state of the first detector and disable the automatic driving when it is determined that the first detector is not in the regular detection state,
wherein a characteristic feature of the vehicle is a shape or color of part of the vehicle, and
wherein when no characteristic feature of the vehicle is included in a set range of the detection region of the first detector, the detection state determiner determines that the first detector is not in the regular detection state.

10. The automatic driving system according to claim 9, wherein the movable part is a door mirror to be selectively moved to a retracted position or a deployed position, and the first detector is a camera to be fixed to the door mirror.

11. An automatic driving system that allows a vehicle to travel by automatic driving, the automatic driving system comprising:
a first detector configured to be disposed on a movable part of the vehicle and to detect an object located around the vehicle;
a second detector configured to be disposed on the vehicle, the second detector having an object detection region that partially overlaps a detection region of the first detector;
a detection state determiner configured to determine whether a detection state of the first detector is a regular detection state on a basis of behavior of the object and a position of the object detected by the second detector, the behavior being estimated from a detection position of the first detector and a traveling state of the vehicle; and
an automatic driving availability determiner configured to determine availability of the automatic driving according to the detection state of the first detector and disable the automatic driving when it is determined that the first detector is not in the regular detection state,
wherein a characteristic feature of the vehicle is a marker provided on the vehicle, and
wherein when no characteristic feature of the vehicle is included in a set range of the detection region of the first detector, the detection state determiner determines that the first detector is not in the regular detection state.

12. The automatic driving system according to claim 11, wherein the movable part is a door mirror to be selectively moved to a retracted position or a deployed position, and the first detector is a camera to be fixed to the door mirror.

* * * * *